United States Patent [19]

Dziggel

[11] Patent Number: 4,641,245

[45] Date of Patent: Feb. 3, 1987

[54] CONVEYOR SYSTEM COMPRISING ELECTRICALLY DRIVEN CONVEYOR CARS THAT ARE CLOSEABLE BY MEANS OF A COVER

[75] Inventor: Klaus-Peter Dziggel, Berlin, Fed. Rep. of Germany

[73] Assignee: Siemens Aktiengesellschaft, Berlin and Munich, Fed. Rep. of Germany

[21] Appl. No.: 601,155

[22] Filed: Apr. 17, 1984

[30] Foreign Application Priority Data

Apr. 18, 1983 [DE] Fed. Rep. of Germany ....... 3313951

[51] Int. Cl.$^4$ ...................... B65G 35/00; B65G 43/00
[52] U.S. Cl. .................................. 364/478; 235/382.5; 340/825.31
[58] Field of Search ....................... 364/408, 478, 436; 180/167, 168, 169; 318/587; 340/52 R, 825.31, 825.32, 825.33, 825.34; 235/382, 382.5

[56] References Cited

U.S. PATENT DOCUMENTS

| Re. 29,846 | 11/1978 | Genest et al. | 361/172 |
|---|---|---|---|
| 3,474,877 | 10/1969 | Wesener | 180/98 |
| 3,881,171 | 4/1975 | Moorman | 340/825.32 |
| 3,948,342 | 4/1976 | Pircher | 180/168 |
| 4,042,058 | 8/1977 | Cooper | 180/168 |
| 4,287,733 | 9/1981 | Gomez-Olea | 70/413 |
| 4,334,221 | 6/1982 | Rosenhagen | 180/167 |
| 4,509,093 | 4/1985 | Stellberger | 340/825.31 |

FOREIGN PATENT DOCUMENTS 3047433 7/1982 Fed. Rep. of Germany .
2022894 12/1979 United Kingdom ................ 364/478

*Primary Examiner*—Jerry Smith
*Assistant Examiner*—Allen MacDonald
*Attorney, Agent, or Firm*—Hill, Van Santen, Steadman & Simpson

[57] ABSTRACT

The closed position of the cover is secured by means of a latch to which an electromechanical actuator is allocated. A control code input at a dispatch station into a control circuit for the conveyor car maintains the latching of the cover until the input of a suitable authorization code at a receiving station. The illustrated embodiment is utilized in conveyor systems for intramural transport of files in order to prohibit access of unauthorized persons to the container contents.

14 Claims, 2 Drawing Figures

CONVEYOR SYSTEM COMPRISING ELECTRICALLY DRIVEN CONVEYOR CARS THAT ARE CLOSEABLE BY MEANS OF A COVER

BACKGROUND OF THE INVENTION

The invention relates to a conveyor system comprising electrically driven conveyor cars whose container space is accepts files and/or transports goods having similar dimensions or, respectively, similar weight and is closeable by means of a cover, and comprising interrogation means allocated to branching locations of the transport line for the interrogation of destination information input into conveyor car-associated destination memories at dispatch stations by means of manually actuatable setting means.

Such conveyor systems are preferably employed for intramural transport within buildings, whereby station means typically discharge into main lines via branching locations of the transport line and said station means usually represent combined dispatch and receiving stations.

Locking the cover of the transport container in such conveyor systems is undertaken for reasons of operating reliability; given an unclosed cover, the transport goods could fall out of the container space, particularly in regions of the transport line in which the conveyor cars run in a suspended (inverted) position. In known conveyor cars, the locking is achieved by means of a bent-back edge surface of the cover onto which a safety latch attached to the outside of the container space can be pushed. In its operating position, the safety latch actuates a contact mechanism for monitoring the closed position; when the contact mechanism is not actuated, the drive circuit for the conveyor car cannot be activated.

It cannot be assured in known conveyor systems that the cover will not be opened on the path between a dispatch station and a receiving station. Such opening can be due to improper locking of the cover or to an intentional or unintentional actuation of the latch. In particular, an unauthorized opening of the transport container by persons not authorized to do so is conceivable. Under given conditions, this possibility of unauthorized access to the container space of such conveyor cars can restrict the scope of employment of such conveyor systems, since a line layout in which all sections of the transport line are placed in parts of a building secured against unauthorized access is frequently impossible. This problem could be resolved in that the transport containers are lockably designed. The outlay for this purpose, however, must be viewed as being relatively high, particularly when these locks are to offer high security against unauthorized opening.

A high degree of security against unauthorized access without the employment of locks at the container spaces is achieved in a conveyor system known from German published application No. 30 47 433 in that those sections of the transport lines in which unauthorized access would be possible are placed in the ceiling region of the rooms so that every truck travels in a suspended position in these sections; in this case a latch member is mounted in the container space, this engaging in a catch contour of the latch or of the cover to effect an additional latching under the influence of gravitational force when the conveyor car proceeds into its suspended position. Since the latch is not accessible from the outside, all undesired opening of the coVer due to obstacles extending into the conveying path or due to opening by unauthorized persons is reliably avoided. This safeguarding of the conveyor cars against unauthorized opening, however, does not enable an entirely free selection of the line layout since the transport lines must be disposed such that the conveyor cars run suspended in all sections in which supervision of the conveyor cars situated on the lines is not possible—particularly in sections where outsiders have access.

Other prior art references of interest include: German patent application No. 24 30 378, dated Dec. 21, 1978; German published application No. 28 13 420, published Oct. 4, 1979; and U.S. Pat. No. 3,474,877, issued Oct. 26, 1969.

SUMMARY OF THE INVENTION

Given retention of complete security against unauthorized opening of the container spaces, the object of the invention resides in regaining complete freedom in the line layout. This is inventively achieved in that an electromechanical drive device is allocated to the latch, said drive device being under the control of a conveyor car-associated control means comprising an authorization evaluation means such that a latch locking code input into the conveyor car at a dispatch station leads to an interlock of the control means and a resulting blocking of the latch until a corresponding authorization code is input at a receiving station.

A number of possibilities exist for supplying the latch locking code to the control means, among which inputting the locking code by means of the setting means is to be viewed as being particularly advantageous. No additional devices are thus required for the formation of the latch locking code, rather the setting means required for the input of the destination information are also employed for inputting the locking code. Insofar as magnets displaceable in guide strips serve as the setting means—as is standard in known conveyor systems—, additional magnets with which the latch locking code is formed can be provided. This can, for example, ensue such that the two or three magnets lying closest to a zero position are employed for the formation of the lock code and two or three further magnets are employed for the formation of the destination information. It is likewise conceivable to separate the setting elements for the formation of the latch locking code from the setting elements serving to form the destination information and to provide a separate guide strip for latch locking code magnets or similar setting elements.

The outlay required for the formation of a latch locking code can, however, be considerably reduced or, respectively, nearly completely eliminated when the setting devices respectively comprise a transmit output that wirelessly influences correspondingly designed receive inputs of the conveyor cars. Such a design of the setting devices is known, for example, from German published application No. 28 13 420, whereby an infrared transmission is specified as an example of the wireless transmission. The setting devices can thus be formed in a particularly simple fashion by means of switches or, respectively, keys whose actuation is converted into corresponding transmit information signals by means of a circuit means internally disposed in the setting means. Given utilization of such a setting device for the formation of the latch locking code, it should be noted that the destination information likewise transmitted via the setting devices and the locking code information can be clearly separated from one another. This occurs, for example, such that the destination information and the locking code can be discriminated on the basis of a destination-information-associated and/or locking-code-associated information component. For example, one of ten digits selectable at the setting device can be respectively intended as the first digit in the locking code. The discrimination between the destination information and the locking code can, however, also ensue in that all destination information comprise an identical informational scope, i.e. the same number of digits, for example, and that a prescribed sequence of inputting the destination information and the locking code be observed.

A further advantageous development of the invention relates to the formation of an authorization, or unlocking, code and provides that the authorization code is input by means of the setting devices. Not only the destination information and the latch locking code but also the authorization code are thus formed by means of the setting devices. Insofar as the setting devices—as described—provide for a wireless transmission of information from a stationary transmitter to the conveyor cars, no additional outlay is required for the formation of the authorization code.

Manual operations at setting devices can, however, be entirely foregone for inputting the locking code and the authorization code into the conveyor cars. The involvement of an operator is thereby replaced in that the locking code is conveyor carinternally derivable from the destination information input into the destination memory. For example, a determination can thus be made that only conveyor cars having a secured cover closure of the container space may be sent to certain receiving stations. When destination information belonging to such a station is input, the existence of such destination information (and the resultant automatic formation of a locking code) is perceived by means of, for example, comparison to destination information for the described species of receiving stations that is stored in the control means; the appertaining locking code is then automatically supplied to the control means.

However, it is also possible that a blocking of the latch is to be undertaken for all conveyor cars that travel from a specific dispatch station to any receiving station. In such a case, the latch locking code can be derived from the destination information allocated to the dispatch station that had been input into the conveyor car as destination information upon arrival of the conveyor car in the course of a previous dispatch event. It is also conceivable that the two described measures be combined with one another, i.e. that two sets of destination information when sending a conveyor car at a certain specific dispatch station to a certain specific, other dispatch station be correlated; the locking code for the control means being generated given the existence of such sets of stored destination information in combination.

According to an advantageous further development of the invention, the control-oriented outlay for, on the one hand, the control means and for, on the other hand, the storage of the latch locking code as well as for the recognition and processing of the authorization code can be kept low in that the control means is realized by means of a microprocessor to which the destination information, the locking code and the authorization code are offered at an input interface. The microprocessor also expediently assumes the storage of the destination information so that the storage, transformation and comparison jobs required in the framework of the invention are all executed by the microprocessor—which is preferably designed as a single-chip processor. The employment of a microprocessor as an essential component of an internal conveyor car control means simultaneously offers the advantage of a high degree of flexibility in the control, i.e. of matching to different system conditions and, in particular, to changes within the system which can relate not only to the safeguarding of the latch for the cover of a container space but can also relate to a change of the destination information and of the authorizations.

The invention shall be explained below with reference to an exemplary embodiment shown in two figures on the accompanying drawing sheets; and other objects, features and advantages will be apparent from this detailed disclosure and from the appended claims.

DETAILED DESCRIPTION

Figure 1:
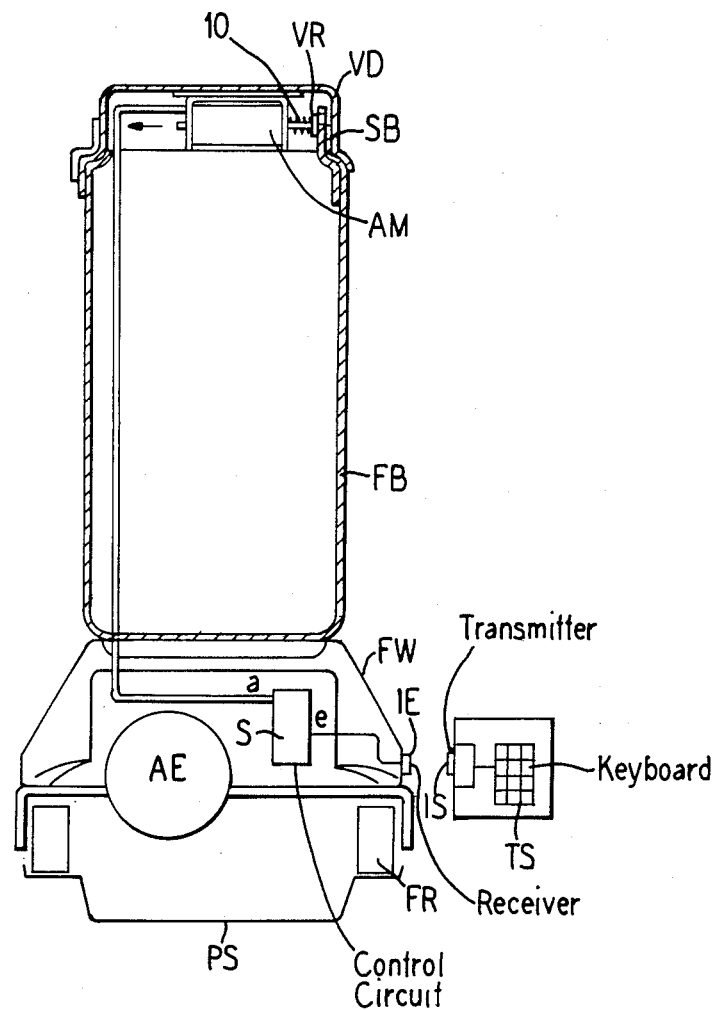
FIG. 1 is a somewhat diagrammatic view showing a conveyor car at a dispatch and receiving station, and showing the transport container and cover in vertical section.
Figure 2:
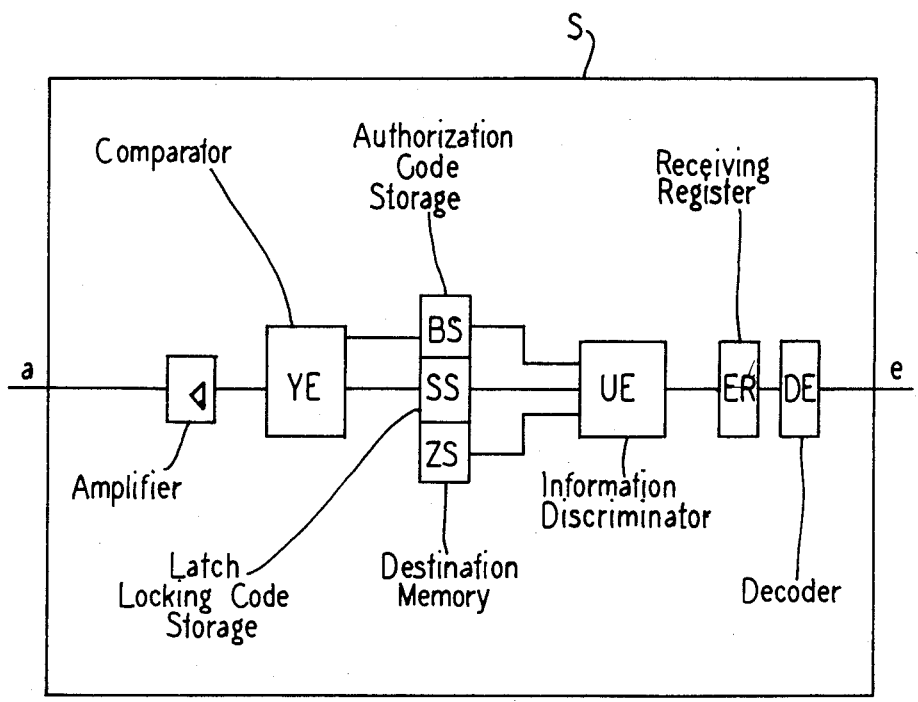
FIG. 2. is a block diagram showing exemplary details of a control circuit for the transport car of FIG. 1.

In a schematic illustration, FIG. 1 shows a conveyor car running on rails at the location of a dispatch and receiving station, whereas FIG. 2 shows details of the conveyor car-associated control means, likewise in a schematic illustration.

The conveyor car shown in FIG. 1 is essentially comprised by a transport container FB mounted on a carriage mechanism FW, said transport container FB having a closing cover VD at its upper region. An actuating electromagnet AM to which a closing latch VR is coupled is mounted on the closing cover VD. In the illustrated position of the closing latch VR, said latch VR engages into the opening of a strike plate SB mounted on the transport container FB to lock the cover in closing relation to the container space.

The carriage mechanism FW has running rollers FR running on conveyor rail sections that are formed by a profile rail PS. The drive ensues electromotively on the basis of a drive means AE (e.g. an electric motor) that draws its drive energy via current paths (not shown) on the profile rail PS. The control of the electromagnet AM is effected by a control means S which is connected to an infrared receiver IE. The infrared receiver IE is influenced by an infrared transmitter IS whose output information is defined by means of a manually actuatable set of keys TS.

The control means S shown in greater detail in FIG. 2 contains a decoder means DE connected to an input e, said decoder means DE being followed by a receiving register ER. Both destination information and the latch locking code or, respectively, the authorization or unlocking code can be input to the control means S with the assistance of the infrared transmitter IS and the infrared receiver IE. A discrimination means UE following the receiving register ER serves for the allocation of the information received at the input e to three memories ZS, SS or, respectively, BS, whereby the memory ZS accepts the destination information, the memory SS accepts the latch locking code, and the memory BS accepts the authorization or latch unlocking code. The outputs of the memories BS and SS are connected to a comparator means VE which emits an output signal given simultaneous existence of mutually identical memory information or, respectively, memory information correlated with one another in a prescribed manner in the two memories BS and SS, said output signal being supplied to the actuating electromagnet AM of the closing latch VR via an output a, with the assistance of a following amplifier means. An unlocking of the closing cover VD therewith ensues.

In an embodiment utilizing a microprocessor, memory components ZS, SS and BS may be provided by memory locations of a read-write random access memory of the computer system. In this case, the keyboard TS may be capable of addressing the respective memory locations. For example, each of three different code letters may be generated by keyboard TS as the first character of respective character sequences depending on which of the three memory locations are to receive the following information digits. The digits for the latch locking code location can be supplied via a keyboard TS at a dispatch station along with the digits representing the desired destination.

During the trip to the desired destination a compression spring 10 may hold the latch VR in locking relation to the cover VD. The control program for the microprocessor will only initiate energization of the electromagnet AM to retract the latch VR against the action of spring 10 when the latch locking code stored in its memory location is matched by an authorization code in the authorization code memory location. The authorization code memory location may be reset to zero whenever a conveyor car is to be dispatched to a new station so that the stored locking code will not match the zero value in the authorization code memory location, and the control program will prevent energization of electromagnet AM until the conveyor car reaches its destination and the correct authorization code is supplied via the keyboard TS at the receiving station.

As an alternative, the latch locking code may be chosen to correspond to (or be derived by means of a formula from) the destination information. Then when the conveyor car reaches its destination, the receiving station may supply the authorization identifying letter and its station number (or number derived therefrom) as the authorization code. When this authorization code is received by a receiving register such as ER, the microprocessor may be controlled in response to the authorization code letter to initiate a comparison of the digits of the authorization code with the stored destination information (or a derivation therefrom). In this case, when the digits correspond, the microprocessor may transmit an energizing command to the energizing circuit for electromagnet AM. By way of example, a spring may continuously urge the cover toward an open position so that momentary energization of the electromagnet AM will automatically result in opening of the cover. The microprocessor may be programmed to supply the destination code to a transmitting register and to repeatedly initiate transmission of this information to an infrared transmitter of the conveyor car during transport operation. In this case, transmission of an authorization code from a receiving station, when contained in the receiving register of the conveyor car may effect an interrupt routine which is selected according to whether the identifying code letter refers to destination information, latch locking information, or authorization code information. The input interface for the computer would thus include interrupt decoding so that one of three control subroutines would be called up depending on the code at one character position of a receiving register such as ER.

As is apparent from the foregoing specification, the invention is susceptible to being embodied with various alterations and modifications which may differ particularly from those that I have described in the preceeding specification and description. It should be understood that I wish to embody within the scope of the patent granted hereon all such modifications as reasonably and properly come within the scope of contribution to the art.

I claim as my invention:

1. A conveyor system, comprising:
   electrically driven conveyor cars for movement between dispatch stations and receiving stations each having a container space and a cover for closing said container space,
   an electromechanical actuator,
   a latch mounted for locking said cover and connected for actuation by said actuator for shifting to a cover locking position, and
   control means for controlling release of said latch from the cover locking position, said control means including an authorization evaluation means for control by a latch locking code established in said conveyor car remotely of a receiving station, and said control means blocking release of said latch until a corresponding authorization code is input at a receiving station and evaluated by said authorization evaluation means as corresponding to the latch locking code.

2. A conveyor system according to claim 1, further comprising:
   destination memories in said conveyor cars connected for storing destination information supplied to said conveyor cars at dispatch stations;
   manually actuatable setting means at the dispatch stations connected to supply destination information to said destination memories of a conveyor car at the station, locking code processing means in said conveyor cars for effecting storage of a latch locking code supplied thereto by means of said manually actuatable setting means.

3. A conveyor system according to claim 2, wherein said locking code processing means is operative to discriminate the latch locking code from the destination information as supplied by said manually actuatable setting means by means of an information component associated with at least one of said latch locking code and said destination information.

4. A conveyor system according to claim 2, further comprising: locking code processing means in said conveyor cars for deriving said latch locking code from destination information stored in said destination memories thereof.

5. A conveyor system according to claim 2, further comprising: manually actuatable setting means at the dispatch stations for supplying destination information to said destination memories of a conveyor car at the station, and processing means in each of said conveyor cars for effecting transmission to said authorization evaluation means of an authorization code which is supplied to the conveyor car by said manually actutatable setting means.

6. A conveyor system as claimed in claim 5, wherein said manually actuatable setting means includes a keyboard 7. A conveyor system according to claim 2 wherein said control means includes microprocessor means for processing the destination information and the latch locking code and the authorization code, said microprocessor means blocking release of said latch until an authorization code corresponding to a given latch locking code is received by said microprocessor means.

8. A conveyor system as claimed in claim 2, wherein said manually actuatable setting means includes a keyboard.

9. A conveyor system according to claim 1, further comprising: manually actuatable setting means at the dispatch stations for wireless coupling with a conveyor car at such station and processing means at each conveyor car for effecting storage of the latch locking code in response to information wirelessly transmitted to the conveyor car from said manually actuatable setting means.

10. A conveyor system as claimed in claim 9, further comprising:
infrared means for wireless coupling with a conveyor 11. A conveyor system as claimed in claim 1, further comprising a spring mounted to continuously urge said cover to an open position.

12. A conveyor system as claimed in claim 1, further comprising:

at least one guide strip disposed extending between the dispatch stations and the receiving stations along which said conveyor cars move;
a plurality of magnets arranged serially in said guide strip to transmit latch locking-codes to said conveyor cars; and
a detector mounted on each of said conveyor cars for detecting said latch locking codes as said conveyor cars move along said guide strips.

13. A conveyor system as claimed in claim 1, wherein said latch locking code is pre-selectable, wirelessly-transmittable intelligence signal received by a conveyor car at a dispatch station prior to a dispatch event, and said authorization code is a wirelessly-transmittable intelligence signal corresponding to said latch locking code formed prior to a predetermined dispatch event and received by said conveyor car subsequent to the predetermined dispatch event at a receive station remote from the dispatch station of the predetermined dispatch event.

14. A conveyor system as claimed in claim 13, further comprising:
infrared means for transmitting said latch locking code between the dispatch station and said conveyor car and for transmitting said authorization code between the receive station and said conveyor car;
a first manually actuatable keyboard connected at a dispatch station to influence said infrared means and actuatable to form said latch locking code; and
a second manually actuable keyboard connected at a receive station to influence said infrared means and actuable to form said authorization means.

* * * * *